United States Patent Office 3,785,994
Patented Jan. 15, 1974

3,785,994
GAS MIXTURE FOR FORMING PROTECTIVE COATINGS ON GRAPHITE
Melvin G. Bowman, 3247 Woodland, and Dwayne T. Vier, 764 43rd St., both of Los Alamos, N. Mex. 87544
No Drawing. Filed Sept. 23, 1960, Ser. No. 58,139
Int. Cl. C01b 2/00; C23c 13/02
U.S. Cl. 252—372
5 Claims

ABSTRACT OF THE DISCLOSURE

A gaseous mixture of hydrogen, hydrogen chloride, and a chloride of titanium, zirconium or niobium, which provides protection for graphite surfaces from hydrogen corrosion at temperatures greater than 1500° C. The composition of the mixture is such that the metal chloride and hydrogen react with graphite to form a protective metal carbide layer.

---

The present invention relates to methods and means of forming protective coatings on graphite surfaces, and to methods and means of maintaining the integrity of such coatings under operating conditions, in particular when such coated surfaces are exposed at high temperatures to hydrogen gas. More particularly, such methods and means are directed to the protection of the graphite coolant channels of a nuclear reactor against corrosion and erosion by hydrogen, especially in nuclear rockets.

Because it is stable at high temperatures, is relatively cheap and has good moderating properties, graphite is frequently selected as the moderator for thermal neutron nuclear fission reactors, either of the heterogeneous or the homogeneous type, including those reactors used for propulsion. In such reactors, it is highly desirable to use hydrogen as the circulating coolant because it has many physical and chemical properties ideally suited to such end, in particular its low molecular weight. Gaseous hydrogen has heretofore been widely used as a coolant in commercial applications, particularly with electrical machinery, and the technology of extracting heat from the gas is well known.

However, in considering the use of hydrogen in the gaseous state as a coolant for a graphite moderated nuclear reactor, two difficulties arise. At the temperature range of operation dictated by considerations of thermodynamic efficiency, 1500° C. and upwards, hydrogen reacts rapidly with graphite to form various gaseous hydrocarbons. These reactions increase rapidly with increase in temperature, a coolant channel losing its form by such corrosion in about 5 minutes at 1900° C. and in a few seconds at 2300° C.

The second difficulty alluded to above is one which arises by virtue of the fact that it becomes desirable to pass the hydrogen coolant through the graphite structure at a fairly rapid rate and at pressures ranging up to tens of atmospheres. Experimental evidence indicates that under these conditions the gas actually erodes the graphite structure, such erosion becoming probable only when corrosion also takes place.

Various techniques have been considered to avoid these difficulties, the solution most frequently suggested being that of coating the graphite coolant channels with a material which will form a smooth coating which is non-reactive with the coolant gas and will seal off the graphite from chemical attack by the gas. Various such materials have some merit and are sufficiently refractory to maintain stable coatings over the desirable temperature operating range of the reactor. Probably the foremost contender among such materials are various metal carbides, and it has been demonstrated that such carbides have all of the desired properties mentioned above.

Although the present invention includes novel methods and means for forming such carbide coatings on graphite surfaces, the experimental work leading to the present invention has demonstrated that such coatings are often insufficient to insure against hydrogen corrosion and erosion under operating conditions. Although smooth, uniform coats of metallic carbides may be laid down on the graphite coolant channels initially, and such coatings adhere well to the graphite base, the thermal and mechanical shocks to which the structure is subjected appear to develop minor cracks and discontinuities in such coatings. When such a structure is heated to a high operating temperature and exposed to a flowing gas consisting solely of hydrogen, the gas sometimes finds its way through such imperfections to rapidly corrode and erode the graphite base, tearing away the carbide layer in the process.

The broad object of the present invention is to furnish methods and means of forming protective coatings on graphite surfaces, coatings which are non-reactive with hydrogen gas at high temperatures.

A further object is to furnish methods and means of protecting the coolant channels of graphite moderated nuclear reactors against the destructive effects of a hydrogen coolant.

Another object is to provide methods and means of preventing hydrogen corrosion of graphite heated to the high operating temperature of nuclear reactors.

Additional objects are to furnish methods and means for (1) forming and (2) maintaining on graphite surfaces coatings which protect such surfaces against the corrosive and erosive effects of hydrogen gas at high operating temperatures.

The present invention consists broadly in exposing the graphite surface to be protected to a gas mixture consisting essentially of hydrogen, a first additive which reacts with the graphite to form a protective coating thereon, and in addition, a second additive necessary to insure that such coating will be formed and that competing undesirable reactions will not take place. Such a gas may be used to form the initial coating as well as protecting the integrity of such coating thereafter, or it may be used only to insure the latter effect, the initial coating being formed by any other feasible process. The latter technique may be thought of as furnishing a coolant or atmosphere which is self-healing in nature, reacting with the graphite at any discontinuities developed in its protective coating to fill in such discontinuities and thereby insure that no free carbon is available for reaction with the hydrogen. It may be broadly outlined as follows:

(1) Let M be any metal which will form a refractory carbide,
(2) Let X represent a halogen gas,
(3) Let HX represent a hydrogen halide gas,
(4) Let $MX_n$ be a metal halide which is a gas at reactor temperatures, then $MX_n$ is a protective gas if the concentrations of MX, HX, and $H_2$ are such that the reaction,

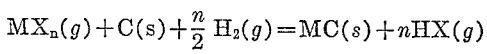

will occur, while the reaction

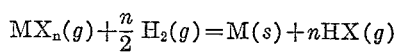

will not occur.

As can be seen from the above equations, the presence of the hydrogen halide gas in the coolant will tend to prevent the undersirable second reaction, which reduces the metallic halide to liberate the solid metal and thereby obstruct the coolant passage. However, at the same time, the presence of the hydrogen halide also tends to drive the desired first reaction in the wrong direction, preventing the formation of the desired metallic carbide on the graphite surface. Experimental work was necessary to determine the operable range of hydrogen halide concentrations, as was also true of the metallic halide concentrations. It is to be understood, of course, that in using the gas mixtures to protect pre-coated surfaces it is desirable to keep the concentrations of each of these halides at a minimum level because they do not have the desirable physical and chemical properties of hydrogen as a coolant or coolant-propellent.

The present inventors have discovered that the chloride system is adaptable to the purposes of the invention as outlined above, that three suitable metals which will form refractory carbide coatings on the graphite surfaces are titanium, zirconium and niobium, and through experimental investigation have found a range of compositions which may be used both to form the initial carbide layer on the graphite coolant passages of a nuclear reactor and protect such passages from corrosion and erosion in the course of high temperature operation. They have also found a range of compositions suitable for pre-coating graphite surfaces but unsuitable for operational protection, the fractions of additives in such compositions being quite high with respect to the hydrogen. Examples of such compositions and the results they produce are listed below to illustrate the range of the present invention.

EXAMPLES

(1) Experiments 3-966

The corrosion specimens consisted of graphite tubes, each having a length of one inch and an inside diameter of 0.02 inch. Each such tube was surrounded by and heated by an induction heater in a vacuum. Gas mixtures initially at room temperature were passed through such tubes heated to different temperatures, and the effects on the inside surfaces observed.

A run with $H_2$ alone at a pressure of about one atmosphere and a velocity of 7500 cm./sec. and a tube temperature of 2100° C. increased the tube bore from 0.02 inch in 30 minutes.

The remainder of the runs were made with a gas mixture consisting of 0.9 atmosphere $H_2$, 0.1 atmosphere HCl and about 0.005 atmosphere $TiCl_4$ flowing through the tube at velocities in the range 7500-9000 cm./sec. In the first of these, the tube was heated to 1500° C. and the gas mixture was passed through for one hour, resulting in a very thin, smooth coating, about 1 mil of TiC on the inner surface, with no other change in the surface, i.e., no erosion or corrosion. The speciment upon cooling retained its TiC coating tenaciously.

The second run was started as above, flowing the gas mixture through the tube at 1500° C. for an hour, after which the specimen temperature was raised by 200° C. increments at 5 minute intervals to 2300° C., the run being continued for 15 minutes at the maximum temperature. Upon being cooled to room temperature, the specimen exhibited a smooth, uniform coating throughout the length of the bore (thickness roughly 2 mils), with no evidence of corrosion or erosion.

The third run was made by heating the specimen to 1900° C., flowing the gas mixture through the tube for 17 minutes, then raising the temperature to 2300° C. while continuing the gas flow. Again a smooth, uniform TiC coating (approximately 2 mils) was obtained throughout the length of the tube.

A fourth run was made by first establishing the flow of the above $H_2$-HCl-$TiCl_4$ mixture at 7500-9000 cm./sec. at room temperature, heating the specimen tube to 2000° C. within 30 seconds, and maintaining such temperature for 55 minutes. A fifth run was identical except that a maximum temperature of 2100° C. was maintained for 35 minutes. In each instance a uniform and adherent layer of TiC, about 1-2 mils thick was formed, with no evidence of corrosion.

(2) Experiments 3-970

These experiments were similar to those in Example 1 except that the gas mixture was 88% $H_2$, 11% HCl and 1% $TiCl_4$ (mole percentages), total pressure about one atmosphere. With the specimens heated to temperatures as high as 2250° C. for times as long as 30 minutes, the protective gas caused coating rather than corrosion or erosion of the graphite bores at velocities as high as 9000 cm./sec. The TiC coatings were thin (1-2 mils), adherent and uniform.

(3) Experiments 3-982

Using the same type of 1-inch long by 20 mil I.D. tubes as in Examples 1 and 2, having a total pressure of about one atmosphere and a gas mixture consisting of 99% $H_2$ and 1% $TiCl_4$ (HCl omitted) was passed through tubes heated to 2170° C. at 9000 cm./sec. for 10 minutes. The $TiCl_4$ was reduced at the inlet end, over the first $\frac{1}{16}$ inch of length, to deposit titanium metal which virtually plugged the bore. The balance of the bore exhibited typical hydrogen corrosion. This work verifies the stated necessity for the inclusion of a hydrogen halide in the gas mixture under the indicated conditions.

(4) Experiments 3-1004

Seventeen run were made by passing a gas mixture consisting of 87% $H_2$, 10% HCl and 3% $TiCl_4$ (volume percentages, identical with mole percentages) at a total pressure of 800 mm. Hg through the bores of 1 inch long by 20 mil I.D. graphite tubes at temperatures at least as high as 2570° C. and gas velocities as high as 17,000 cm./sec. TiC coatings of uniform thickness (approximately 2-3 mils) were formed in times of the order of 10-15 minutes, with no indication of erosion and no appreciable thickening of the coatings when the runs were continued for longer times.

Using the same size graphite tube and the same gas mixture, a specimen heated to 2100° C. was exposed to the flowing gas at 9000 cm./sec. for 10 minutes. The result was a uniform TiC coating, approximately one mil thick, over the entire length of the 20 mil diameter hole. There was no evidence of corrosion or erosion. The tube temperature was then raised to 2520° C. and the gas flow continued for an additional 10 minutes at 9000 cm./sec., with no corrosion or erosion, with some increase in the thickness, but no apparent change in the uniformity of the TiC coating.

Another specimen was coated with TiC at 2100° C. as above, after which its temperature was raised to 2520° C. and pure $H_2$ was passed through for 10 minutes at 9000 cm./sec. The carbide coating was completely stripped from the first half of the 20 mil hole and typical hydrogen corrosion was evident. In the remainder of the tube, pitting was observed and the residual carbide coating appeared to be "blistered," or raised from the graphite surface.

(5) Experiments 3-1010

These were similar to the above except that the graphite tubes contained 35 milligrams of uranium (as carbides) per cc. The tubes were heated to 2540° C. in a mixture of 87% $H_2$, 10% HCl and 3% $TiCl_4$ at atmospheric pressure for 10-15 minutes, resulting in uniform 2-3 mil coatings of TiC over the entire length with no corrosion or erosion with continuous flow. The loading of the graphite with uranium had no apparent effect on the coating process or the results thereof.

(6) Experiments 3-1049

Using the same size tubes as in the examples above, graphite bores were coated and protected in a 30 minute run at 2550° C. by a gas mixture consisting approximately of 94% $H_2$, 5% HCl and 1% $ZrCl_4$ flowing through the tubes at a rate of 9000 cm./sec. The ZrC coating was smooth, uniform and adherent, with a thickness of about 2 mils.

(7) Experiments 3–1052

In the first of these runs a gas mixture containing 97.5 v/o $H_2$ and 2.5 v/o $ZrCl_4$ was passed for 10 minutes through the same size (1 inch long by 20 mil I.D.) graphite tubes at 2000° C. and a velocity of 9000 cm./sec. The necessity for some HCl was demonstrated, as the upstream part of the bore was plugged with Zr metal and the balance exhibited typical $H_2$ corrosion.

A mixture of 94 v/o $H_2$, 5 v/o HCl and 1.5 v/o $ZrCl_4$ (total pressure approximately one atmosphere) coated and protected a bore of the same size tube during a 15 minute run at 2200° C. with a flow rate of 9000 cm./sec., the ZrC coating being about 1 mil thick. An identical run with the $ZrCl_4$ concentration reduced to 0.75 v/o (more $H_2$) resulted in a coating of the same thickness after only 5 minutes, both coatings also being smooth, uniform and adherent.

(8) Experiments 3–1056

Graphite tubes of the same dimensions as those in the above examples were exposed at 2550° C. to a gas mixture consisting of 95.6 v/o $H_2$, 3.4 v/o HCl and 1 v/o $ZrCl_4$ at a total pressure of 1000 mm. of Hg, flowing at 21,000 cm./sec. for 15 minutes. A smooth, uniform and adherent coating of ZrC of about 1–2 mils thickness was formed and served to protect the graphite bore during the duration of the run.

An identical run except that the gas composition was 97.6 v/o $H_2$, 1.4 HCl and 1 v/o $ZrCl_4$ prevented corrosion and erosion of the graphite but caused a reduction in the bore diameter at the entrance to the hot zone by the deposition of zirconium metal. This result indicates that the competing reaction referred to above was taking place simultaneously and that the HCl concentration was too low.

Other such tubes were exposed at a temperature of 2530° C. to gas mixtures containing 7.8 v/o HCl, 90–91 v/o $H_2$ and 1–2.5 v/o $ZrCl_4$ flowing at 21,000 cm./sec. for 10 minutes. The resulting coatings were thin (approximately one mil) and adherent, but not as smooth as those obtained with HCl contents of 3.4 v/o.

(9) Experiments 3–1060

These runs were essentially identical with those in Examples 6–8 above except that the graphite was loaded with 100 milligrams of uranium per cc. The results were essentially identical, demonstrating that the uranium loading has no apparent effect on the formation of the coating.

A series of runs were made on the same size tubes using $NbCl_5$ rather than $TiCl_4$ or $ZrCl_4$. The results indicate that gas mixtures containing as little as 0.6 v/o $NbCl_5$, from 13 to 30 v/o HCl and 69 to 86 v/o $H_2$ will act as protective gases by forming and maintaining smooth and adherent NbC coatings of about 1–3 mils thickness at temperatures at least as high as 2530° C. and with gas velocities as high as 21,000 cm./sec. (These runs were continued for as long as 30 minutes, with no apparent change after the first 10–15 minutes.) With higher $NbCl_5$ concentrations (1.5 v/o) or lower HCl (66 v/o) concentrations, the coatings were not uniform, increasing from a reduced diameter bore at the upstream portion to thin deposits at the exit end, sometimes with corrosion.

(10) In addition to the above work, many graphite tubes of larger bore and length have been successfully carbided by various gas compositions. As one example, one mil and thicker coatings of NbC have been formed on 27-inch long tubes having inside diameters in the range 1/16–1/8 inch at a flow rate of 1 liter/minute (approximately atmospheric pressure) and a tube temperature of 2000° C. The gas compositions were varied from 17 v/o $H_2$, 78 v/o HCl and 5 v/o $NbCl_5$ to 5 v/o $H_2$, 8 v/o HCl, 3–4 v/o $NbCl_5$, and 83–84 v/o He. Helium was used as a convenient diluent to reduce the viscosity of the gas mixture.

Similar coatings were obtained on graphite tubes of comparable size at a lower temperature, 1700° C., but at the same 1 liter/minute flow rate. Although somewhat longer times were required to form 1 mil or thicker coatings, the results were otherwise the same—tenaciously adherent coatings with no corrosion or erosion. The gas composition was varied from 37 v/o $H_2$, 58 v/o HCl and 5 v/o $NbCl_5$ to 65 v/o He, 5 v/o $NbCl_5$, balance $H_2$ and HCl in approximately the same 37–58 volume ratio.

It should be noted from the above examples that graphite surfaces may be coated with an extremely wide range of gas compositions, ranging from the predominantly hydrogen, low additive mixtures which are also used as coolants or coolant-propellants to the low hydrogen, high hydrogen halide and metal halide compositions discussed under Example 10 above. The latter may be used for pre-coating as distinguished from operational use for cooling or propulsion purposes because in pre-coating such characteristics as molecular weight are immaterial. The fraction of metal halide in the pre-coating mixture may be made quite high, provided the hydrogen halide concentration is also increased to prevent the metal-liberating reaction and there is still sufficient hydrogen for the carbide forming reaction. Such maxima have not yet been determined.

It should also be pointed out that other variables than composition enter into the proper utilization of the present invention, in particular temperature and flow rate. These variables and the composition variable are intimately associated with the phenomenon of diffusion, as it is evident that this phenomenon accounts for the production of carbide layers of appreciable thickness. Carbon particles from the graphite substrate diffuse through the carbide coating to react with the gas stream and thereby increase the thickness of the coating, the diffusion rate decreasing with increasing coating thickness. If such diffusion did not occur, the carbide coating would be less than a micron in thickness, of the order of a few hundred molecules, an impractically low value for the applications involved.

As intimated above, the diffusion rate is highly temperature dependent. Below about 1500° C., carbon diffuses so slowly through a carbide coating that the technique of the present invention is impractical for pre-coating and is unnecessary for protecting a pre-coated surface. As the temperature is increased, the diffusion rate increases so rapidly that some attention must be devoted to the possibility that the upstream portion of the graphite surface will react so rapidly and continuously with the entering gas that the downstream portion is left unprotected and experiences corrosion by the salt-depleted gas stream. Something of this sort was observed in one of the experiments summarized in Example 10 above, in which a relatively high niobium chloride concentration and relatively low hydrogen chloride concentration were employed.

This difficulty may be overcome by various techniques such as operating at a rleatively low temperature, maintaining the metal halide and hydrogen halide concentrations at relatively high values, maintaining a relatively high flow rate, or various combinations of these expedients. The problem is not particularly pronounced in using the gas mixtures of the present invention to protect pre-coated surfaces, as the diffusion rate of carbon through the relatively thick coating is comparatively low, even at the higher operating temperatures. In pre-coating graphite surfaces in quantity, where processing speed dictates conditions of the higher temperatures and higher flow rates, it has been found to be advantageous both to use a relatively high fraction of metal in the gas mixture and to dilute such mixture with a low viscosity inert gas, preferably helium. The use of helium has the effect of making it possible to reduce both the hydrogen and hydrogen halide concentrations relative to that of the salt (metal halide), thus lowering the viscosity and making it possible to obtain the desired high flow rates without providing the large pressure drop over the graphite surface which is necessary with the more viscous, undiluted mixtures.

It should not be inferred from the above that the present invention is useful in coating and protecting only small bore graphite surfaces, or that it is limited to cylindrical channels and other internal surfaces. There is no limit to the inside dimensions or geometry of a channel to be coated or protected, the only scaling required being that of increasing the volumetric flow rate to obtain a uniform coating in a reasonable time or to adequately protect a pre-coated surface. Obviously such objects as graphite blocks may be coated by disposing and supporting them within a channel defined by a non-reactive wall.

In connection with the compositions of the gas mixtures used only for protecting pre-coated surfaces, it should be noted that it may be possible to eliminate all hydrogen halide when operating at high temperature. This follows because the metal halides, in particular $NbCl_5$, react with the hydrogen in the gas stream to form the necessary HCl together with lower halides of the metal.

What is claimed is:

1. A gas mixture for protecting graphite surfaces from hydrogen corrosion at temperatures greater than 1500° C. consisting essentially of hydrogen in a concentration of 87 to 95.6 volume percent, hydrogen chloride in a concentration of 3.4 to 11 volume percent, and a metal chloride selected from the group consisting of titanium, zirconium, and niobium chlorides in a concentration of 0.5 to 3 percent.

2. The protective gas mixture of claim 1 in which said metal halide is zirconium chloride in the proportion 0.75 to 3 volume percent and said hydrogen halide is hydrogen chloride in the proportion 10–11 volume percent.

3. The protective gas mixture of claim 1 in which said metal halide is zirconium chloride in the proportion 0.75 to 2.5 volume percent and said hydrogen halide is hydrogen chloride in the proportion 3.4–7.8 volume percent.

4. A gas mixture for protecting graphite surfaces from hydrogen corrosion at temperatures greater than 1500° C. consisting essentially of hydrogen in a concentration of 69 to 86 volume percent, hydrogen chloride in a concentration of 13 to 30 volume percent, and niobium chloride in a concentration of 0.6 to 1.5 volume percent, said concentrations being selected so that said niobium chloride and hydrogen will react with graphite at a temperature of at least 2530° C. to form a niobium carbide coating on said graphite.

5. A gas mixture for protecting graphite surfaces from hydrogen corrosion at temperatures greater than 1500° C. consisting essentially of hydrogen in a concentration range of 17 to 37 volume percent, hydrogen chloride in a concentration range of 58 to 78 volume percent, and niobium chloride in a concentration range of 3 to 5 volume percent, said concentration being selected so that said niobium chloride and hydrogen will react with graphite when said mixture is flowing through a 1/16 to 1/8 inch diameter graphite tube having a temperature above 1700° C. at a flow rate of one liter per minute to form a coating of niobium carbide on said graphite.

References Cited

UNITED STATES PATENTS

| | | | |
|---|---|---|---|
| 3,151,852 | 10/1964 | Weech et al. | 117—106 C |
| 1,411,421 | 4/1922 | Dow | 252—372 |
| 2,519,864 | 8/1950 | Weisz | 252—372 |
| 2,678,892 | 5/1954 | Harvey | 117—118 |
| 2,736,670 | 2/1956 | Griffiths | 117—118 |
| 2,962,353 | 11/1960 | Haimsohn | 23—87 T |

OTHER REFERENCES

BMI—1296, AEC Document "NbC Coatings of Graphite Tubes," Oct. 6, 1958.

LELAND A. SEBASTIAN, Primary Examiner

R. S. GAITHER, Assistant Examiner

U.S. Cl. X.R.

117—106 C, 118

UNITED STATES PATENT OFFICE
CERTIFICATE OF CORRECTION

Patent No. 3,785,994          Dated January 15, 1974

Inventor(s) M. G. Bowman, and D. T. Vier

It is certified that error appears in the above-identified patent and that said Letters Patent are hereby corrected as shown below:

After title delete:
"Melvin G. Bowman, 3247 Woodland, and Dwayne T. Vier, 794 43rd St., both of Los Alamos, N. Mex. 87544"

and substitute:

--Melvin G. Bowman and Dwayne T. Vier, both of Los Alamos, N. Mex., assignors to the United States of America as represented by the United States Atomic Energy Commission--

Signed and sealed this 16th day of July 1974.

(SEAL)
Attest:

McCOY M. GIBSON, JR.
Attesting Officer

C. MARSHALL DANN
Commissioner of Patents